June 10, 1930.  W. T. VAN ORMAN  1,763,569
APPARATUS FOR AND METHOD OF TREATING FABRICS
Filed April 16, 1929
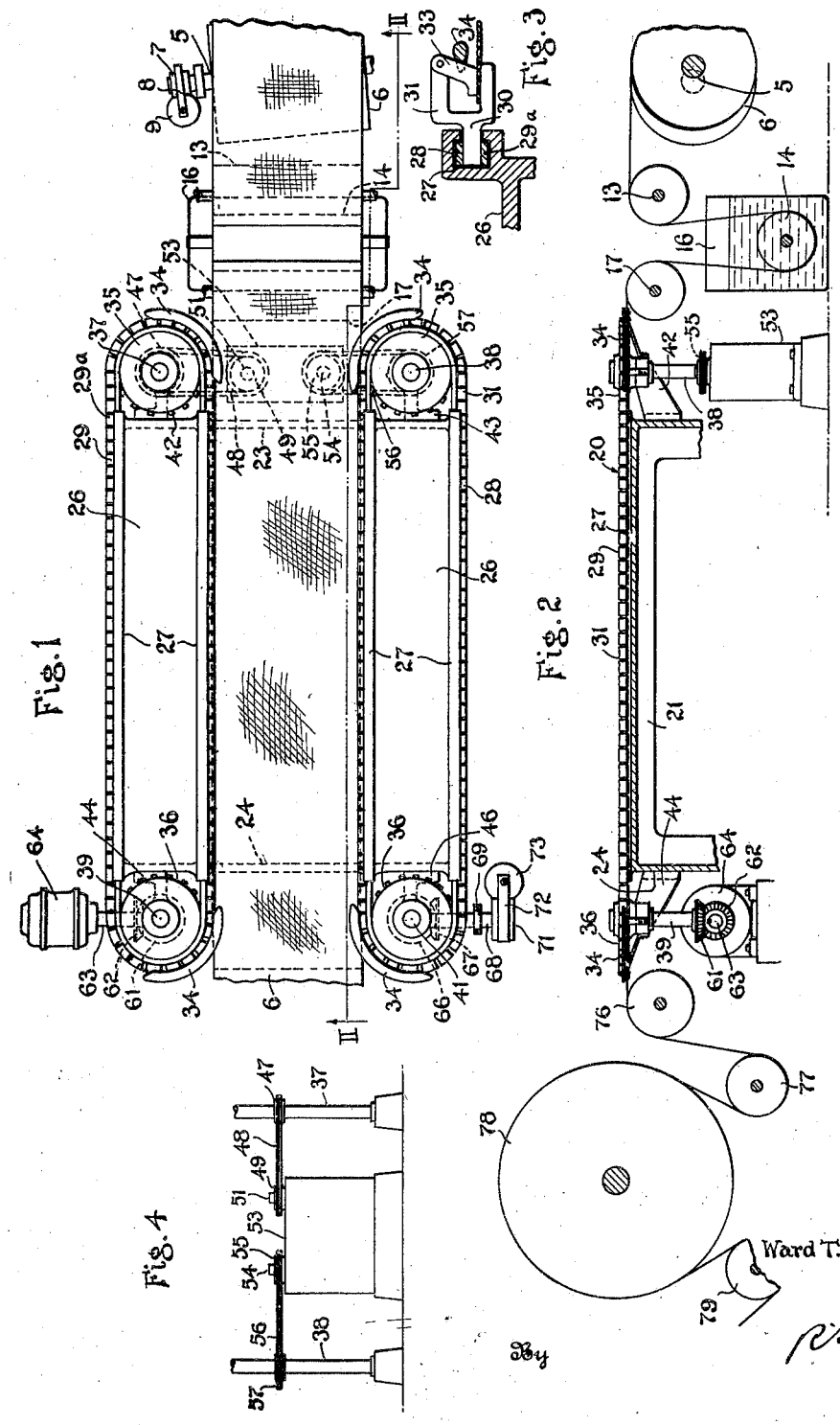
Inventor
Ward T. Van Orman
Attorney Patented June 10, 1930

1,763,569

UNITED STATES PATENT OFFICE

WARD T. VAN ORMAN, OF AKRON, OHIO, ASSIGNOR TO THE GOODYEAR TIRE & RUBBER COMPANY, OF AKRON, OHIO, A CORPORATION OF OHIO

APPARATUS FOR AND METHOD OF TREATING FABRICS

Application filed April 16, 1929. Serial No. 355,527.

This invention relates to an apparatus for and method of treating fabrics and it has particular relation to the treatment of breaker strip fabric employed in the construction of pneumatic tires for motor vehicles.

One object of the invention is to provide a method of producing a breaker strip peculiarly adapted for use in the construction of pneumatic tires by the so-called "flat-built" method.

Another object of the invention is to provide an apparatus for racking breaker strip material in which the degree of distortion imparted to the breaker strip material may be accurately and uniformly controlled.

In the construction of pneumatic tires for motor vehicles a relatively narrow band or strip of fabric of large mesh is usually disposed between the plies of cord fabric and the rubber tread element. This strip functions as a cushion to absorb shocks which might otherwise occur at the junction between the rubber ply and the fabric of the carcass. In the construction of tires by the so-called "flat-built" method, the various plies of material of which the tire is composed are assembled upon a pulley or drum of approximately the same diameter as the inextensible beads employed in the construction of the tires. The tire bands thus formed are then placed upon an expansible form or in a vacuum shaper where the tread portion is expanded and the beads of the tire are caused to approach each other, thereby imparting to the tire the toroidal form requisite to pneumatic tire casings. The various plies of material including the breaker strip, when incorporated into the band, are of substantially the same overall diameter as the beads of the tire. Therefore, it is obvious that upon expansion of the tread portion of the tire the various plies of material are subjected to considerable tension due to the increase in diameter of the intermediate portions thereof. In a breaker strip, which is composed of square woven fabric of relatively inexpansible character, the stress is sometimes so great as to cause the rupturing of the cords or threads of which the fabric is composed.

To overcome this difficulty it has been proposed so to distort the breaker fabric prior to its incorporation into the tire as to impart a substantial diamond shape to the interstices between the adjacent cords. The fabric thus distorted is cut upon a bias so that when the strips are incorporated into the tire carcass and shaped the expansion tends to cause the cords to return to their original normal relation with respect to each other. Excessive strain on the cords is obviated. The theory involved in this method of treating breaker strip fabric is discussed in detail in Patent No. 1,607,266. This method of treating the fabric whereby the warp and weft threads are caused to assume oblique angles with respect to each other is termed in commerical parlance "racking" the breaker strip. "Racking" has heretofore been accomplished by drawing the fabric obliquely from a roll of fabric the rotation of which was retarded by suitable brake mechanism in order to impart a greater degree of tension to one edge thereof than to the other. However, it has been found difficult to impart a sufficient degree of distortion to the fabric by this method.

According to this invention the fabric is drawn through a tentering machine in which one of the tentering chains is driven at a greater velocity than the other, and it is possible to obtain a racking action which may be accurately controlled merely by controlling the relative velocities of the two chains with respect to each other. By this method the fabric can be distorted to as great a degree as desired.

For a better understanding of the invention, reference may now be had to the accompanying drawings, forming a part of the specification, of which;

Figure 1 is a plan view illustrating diagrammatically a preferred embodiment of the invention;

Figure 2 is a fragmentary cross-sectional view of the apparatus taken substantially along the lines II—II of Figure 1;

Figure 3 is a fragmentary detail view showing one of the fabric gripping devices of the tentering chains; and Figure 4 is a fragmentary end elevational view of the apparatus.

In practicing the invention, a shaft 5 is provided for a roll of fabric 6. As best shown in Figure 1, this shaft may be set at a right angle, or other convenient angle with respect to the line of travel of the fabric. In order to apply longitudinal tension to the fabric the shaft is provided at one end thereof with a drum 7 about which is trained a brake band 8 having a tensioning weight 9 attached thereto. The fabric from the roll 6 preferably is passed over an upper guide roller 13 and under a roller 14, which is immersed in a bath of latex contained in a tank 16, whereby to impart to the fabric a tacky coating which insures adequate adhesion between it and the plies of material contained in the tire carcasses. A guide roller 17 is disposed adjacent the mouth of the tank 16 in position to receive the fabric from the roller 14 and to direct it to a tentering machine indicated generally by the numeral 20.

This machine comprises a base composed of side frames 21 interconnected at their ends by means of cross bars 23 and 24. As best shown by Figs. 1 and 3, the upper edges of the frames 21 are expanded into horizontal plates 26 whose edge portions are so shaped as to provide guideways 27 for tentering chains 28 and 29, the links 29ª of which have devices 30 for releasably clamping the marginal portions of the fabric. Each clamping device comprises a portion 31 of C-shaped secured at the bight thereof to each of the links 29ª and have a downwardly disposed pawl 33 pivoted to the upper branch thereof. The free end of the pawls so engage the lower branches of the members 31, as to clamp the marginal portions of the fabric. In order to cause the clamping devices to engage the fabric upon its entry into the tentering machine and to release it upon its exit therefrom, arcuate cams 34 are disposed at the ends of the supports 21 in such position as to engage and lift the pawls 33. The chains 28 and 29 are trained about rear sprocket gears 35 and forward sprocket gears 36, which are keyed upon vertically disposed shafts 37, 38, 39 and 41, that in turn are journalled within bearing portions formed in brackets 42, 43, 44 and 46 upon the end portions of the frame 21. In order to provide a positive driving connection between the shafts 37 and 38, the first mentioned shaft has keyed thereto a sprocket gear 47 about which is trained a sprocket chain 48. This chain is trained about a second sprocket gear 49 which is keyed to a shaft 51, of a variable speed control mechanism of any convenient type indicated diagrammatically at 53. As best shown in Figure 4, the speed control mechanism is provided with a transmission shaft 54 that has a sprocket gear 55 secured thereto. A sprocket chain 56 is trained about the latter and provides a driving connection between it and a driven sprocket gear 57 which is keyed to the shaft 38. By proper manipulation of the speed control mechanism substantially any desired differential of speed between tentering chains 28 and 29 can be effected.

The lower extremity of the shaft 39 has a beveled gear 61 keyed thereon that engages a corresponding beveled gear 62 upon the extremity of a drive shaft 63 of a motor 64.

If desired, the shaft 41 also may be extended downwardly and the lower extremity thereof may be provided with a beveled gear 66 meshing with a corresponding beveled gear 67 mounted upon a horizontally disposed shaft 68 which is journaled in bearings 69. The outer extremity of the shaft 68 is keyed within a brake drum 71 which rotates within a brake band 72. In order to regulate the tension upon the latter, one end thereof is provided with a weight 73 which may be increased or decreased according to the degree of tension desired upon the fabric. Of course, if it is desired to produce a difference in relative velocity between the tentering chains 28 and 29 by means of the brake mechanism, the speed control mechanism 53 should be disengaged from the shaft 37, whereby to permit the chain 28 to be driven solely by the tension produced upon the fabric 6 by the chain 29. It is to be understood that either the brake mechanism or the speed control mechanism 53 may be omitted from the device without departing from the spirit of the invention, because obviously a difference in relative velocity of the chains 28 and 29 may be produced by either of these mechanisms independently. However, in order to permit accurate control of the relative distortion of the fabric from substantially zero to the maximum which may be desired, it is preferable to provide the machine with both control devices.

Guide rollers 76 and 77 are disposed adjacent the front end of the tentering machine in such position as to receive the fabric from the machine and to direct it over a drying drum 78 of conventional design. Fabric from the drum passes under a guide roller 79 from which it is delivered to an apparatus (not shown), for winding it within a liner for storage.

In the operation of the machine, a roll of fabric 6 is placed upon the shaft 5. The end of the fabric is then directed over the roller 13 and downwardly beneath the roller 14 within the tank 16 and over the roller 17, after which it is directed to the tentering machine 20.

As the chains 28 and 29 travel along the guideways 27, the pawls 33 of the clamps 30 are engaged and lifted by the cams 34 at the rear of the tentering machine. This operation permits the marginal portions of the fabric to pass under the pawls 33, by which they are engaged when the latter are released from the cams 34. At the forward end of the machine the second set of cams engage the pawls, thereby releasing the fabric and permitting it to pass to the guide rollers 76.

By proper adjustment of the speed control mechanism 53, the requisite difference in relative velocity is obtained between the chains 28 and 29, whereby to impart the desired degree of distortion to the breaker fabric. In case the degree of distortion is relatively great, the speed regulating mechanism may be disconnected and the chain 28 driven entirely by the tension produced upon the fabric by the driven tentering chain 29. The degree of distortion may then be regulated by regulating the weight 73 upon the brake band 72.

This invention permits the racking of the fabric to substantially any desired degree. When the device has been adjusted to impart a given degree of distortion to the fabric its operation is substantially uniform. It will be observed that at the same time the fabric is subjected to a racking stress it is also placed under transverse tension by the action of the chains 28 and 29, so that the fabric is uniformly stretched throughout its width. This prevents undue narrowing of the fabric due to the longitudinal tension thereon, which is a serious defect encountered in the practice of the methods heretofore employed in racking breaker fabrics.

Although I have illustrated only one form which the invention may assume and have described in detail only a single application thereof, it will be apparent to those skilled in the art that it is not so limited, but that various modifications may be made therein without departing from the spirit of the invention or from the scope of the appended claims.

What I claim is:

1. A machine for racking fabric comprising tentering chains for simultaneously gripping the marginal portions of the fabric, means for continuously driving one of the chains, and means for producing a continuous relative lag between the driven chain and the other chain.

2. A machine for racking breaker strip fabric comprising a pair of oppositely disposed tentering chains for gripping the marginal portions of the fabric, means for continuously driving one of the chains, and means interconnecting the chains for producing a continuous differential of relative speed between the chains.

3. A machine for tentering breaker strip fabric which comprises a driven tentering chain for grasping one marginal portion of the fabric, a second tentering chain for grasping the other marginal portion, and a variable speed control mechanism interconnecting the two chains, whereby continuously to drive one chain at a greater velocity than the other.

4. A method of racking a strip of fabric which comprises continuously advancing both edges of the fabric along substantially straight approximately parallel paths while subjecting a portion of one edge to a continuous longitudinal pull urging it forward while at the same time subjecting the other edge to a continuous longitudinally directed retarding force.

5. A method of racking a strip of fabric which comprises drawing it diagonally from a roll, passing it continuously along a substantially straight line path, subjecting a portion of one edge thereof to a continuous forwardly directed pull and at the same time subjecting the other edge thereof to a continuous rearwardly directed retarding force.

In witness whereof, I have hereunto signed my name at Akron, in the County of Summit and State of Ohio, U. S. A., this 13th day of April, 1929.

WARD T. VAN ORMAN.